H. KLECKLER.
DUPLEX V-STRUT LANDING GEAR.
APPLICATION FILED DEC. 22, 1916.

1,294,476.

Patented Feb. 18, 1919.
3 SHEETS—SHEET 1.

Inventor
HENRY KLECKLER

By John P. Tarbox
Attorney

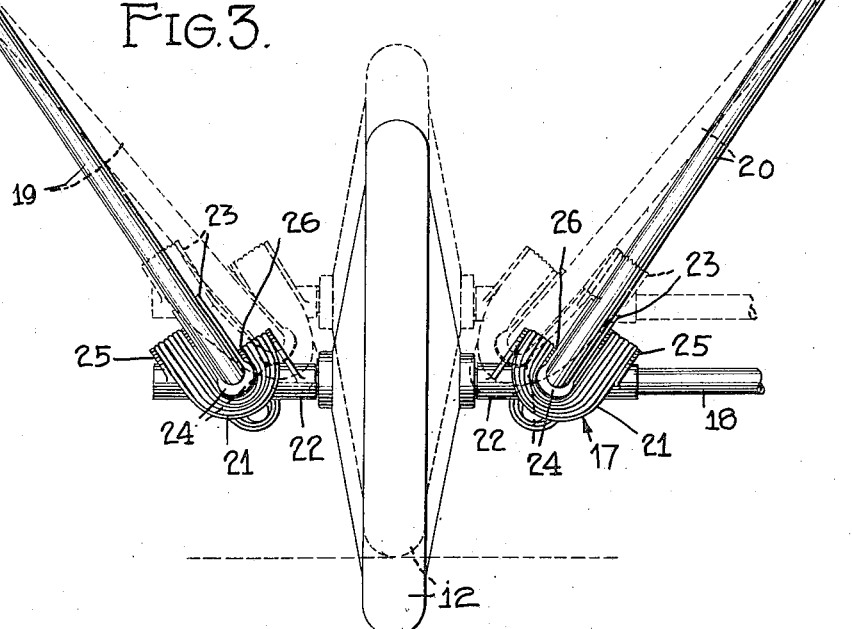
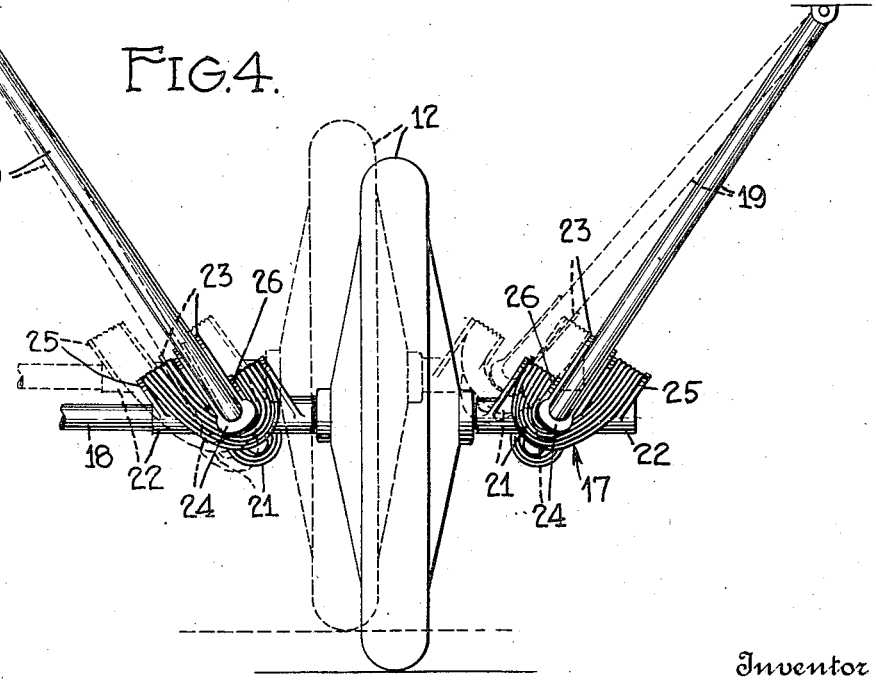

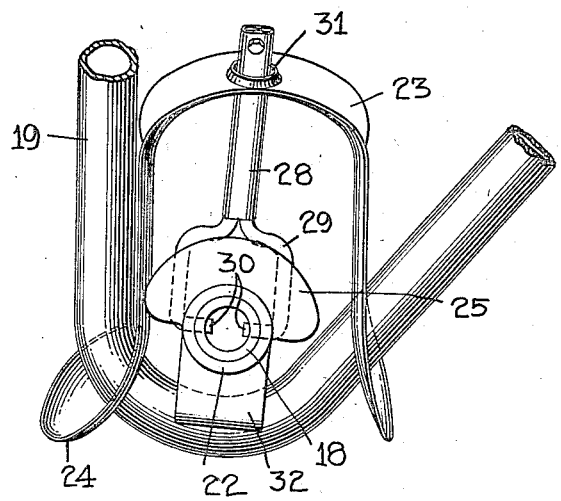
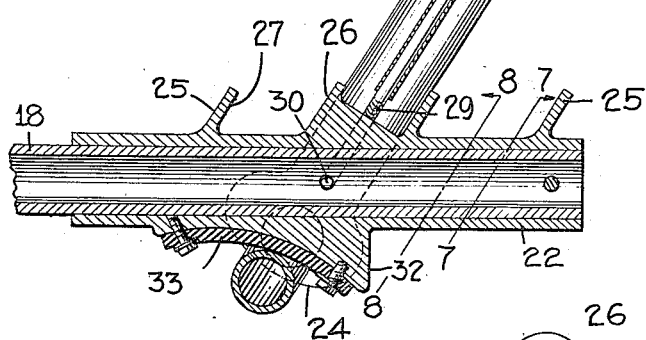
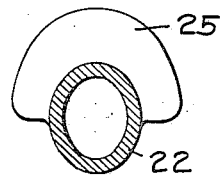
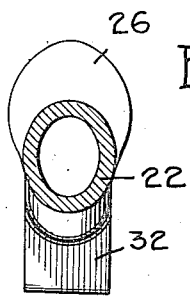

UNITED STATES PATENT OFFICE.

HENRY KLECKLER, OF BUFFALO, NEW YORK, ASSIGNOR TO CURTISS AEROPLANE AND MOTOR CORPORATION, A CORPORATION OF NEW YORK.

DUPLEX V-STRUT LANDING-GEAR.

1,294,476.

Specification of Letters Patent. Patented Feb. 18, 1919.

Application filed December 22, 1916. Serial No. 138,494.

*To all whom it may concern:*

Be it known that I, HENRY KLECKLER, a citizen of the United States, residing at Buffalo, in the county of Erie and State of New York, have invented certain new and useful Improvements in Duplex V-Strut Landing-Gear, of which the following is a specification.

My invention relates to launching and landing gear for aircraft of a type wherein provision is made for the efficient transmission of launching and landing impact to the landing gear axle regardless of the angle from which the shocks are directed. More particularly the invention is concerned in an improved chassis strut arrangement whereby landing shocks are obliquely transmitted to four points on the landing gear axle and the resulting impact distributed equally at opposite sides of the landing gear wheels in the immediate vicinity thereof. This arrangement is particularly desirable in the multi-motored or larger types of aircraft wherein the weight masses are well distributed.

Another and important characteristic of the invention is the V-arrangement of the oblique or V-arranged struts. The struts are equipped with fixed pivot-axes and movable pivot-axes respectively at their opposite ends. This arrangement permits efficient absorption of both vertically and laterally directed shocks. The wheels and axle move together bodily laterally and vertically.

Heretofore, in constructing launching and landing gear for aircraft, shocks incident to landing were directed to points in the vicinity of the landing gear wheels at the inside thereof only. This unequal distribution of total impact subjected the landing gear axle to a bending moment of enormous value and not infrequently distorted the axle to such an extent as to render the landing gear entirely unfit for use. Moreover, no practical provision has heretofore been made for side swipes or laterally directed shocks.

With the above in view it is proposed by the present invention: first, to provide for a symmetrical and direct transmission of impact shocks to the landing gear axle equally at opposite sides and immediately adjacent the landing gear wheels; second, to provide for both lateral and vertical movement of the landing gear wheels and axle; third, to provide for an efficient distribution of the total weight of the motor masses (in a multi-motored craft) onto a multiple number of shock arbsorber elastics regardless of launching and landing conditions; fourth, to V-arrange the struts from every angle, that is, in pairs if viewed from the front or rear and singly if viewed from either side; fifth, to simplify and improve the mounting for the several shock absorber elastics; sixth, to generally increase the strength and efficiency of the landing gear without proportionately increasing its bulk or resistance; and seventh, to provide for usage of an auxiliary or third wheel if desired.

In describing my invention in detail, reference will be had to the accompanying drawings wherein like characters of reference designate like or corresponding parts throughout the several views, of which:

Fig. 3 is a detail view of a portion of the landing gear illustrating in dotted lines the position assumed by certain of the landing gear parts under the impact of landing;

Fig. 4 is a similar view illustrating similarly a different position assumed by said parts under different conditions of landing;

Fig. 5 is a detail view of the shock absorber mounting;

Fig. 6 is a sectional view illustrating said mounting, and

Figure 1:
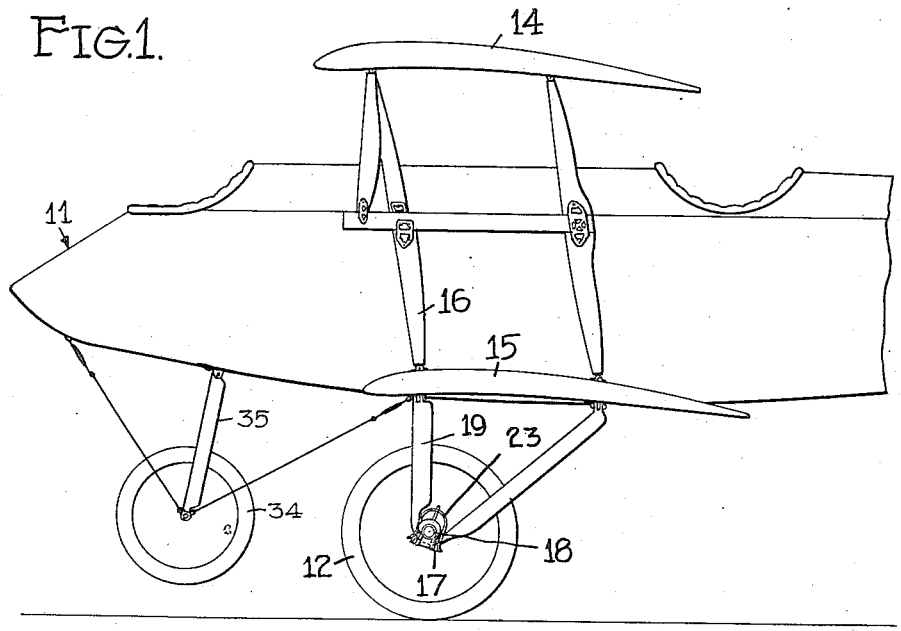
Figure 1 is a side elevation (partly broken away) of a twin motored aeroplane equipped with the improved landing gear described herein.

Figs. 7 and 8 are sections respectively on the lines 7—7 and 8—8 of Fig. 6.

In the embodiment of my invention selected for illustration, the landing gear designated in its entirety by the numeral 10, is shown as arranged symmetrically beneath the fuselage 11 of a twin motored aeroplane, the wheels of the landing gear, each denoted 12, being disposed in planes laterally removed from the sides of the fuselage and preferably in planes approximately equidistant from said sides and the longitudinal axis of the twin motor units. The motor units, each designated 13, are mounted intermediate the supporting planes 14 and 15 symmetrically at opposite sides of the fuselage 11. Wing post frames 16 interconnect the planes and support the motor units.

The struts of the landing gear engage with the underneath surface of the fuselage and with the underneath surface of the lower supporting plane and with the shock absorbers designated each in its entirety by the numeral 17. All struts extend oblique to the axis of the landing gear axle 18. The outside struts which I have designated 19 engage with the lower supporting plane 15 respectively directly beneath the motor units 13 in the planes of the wing spars (not shown). By this arrangement the impact shocks of the motor masses in launching and landing are directed obliquely inwardly to the landing gear wheels. The inside struts of the landing gear I have designated 20. These struts engage the underneath surface of the fuselage 11, preferably in the plane of the aforementioned spars and from their points of securement extend obliquely outwardly for contact with said axle at points adjacent the inside faces of the respective wheels. In each instance the obliquely extending struts 19 and 20 are V-arranged when viewed from either side (see Fig. 1) and if viewed from either the front or rear may again be described as V-arranged, the pairs of struts in this latter instance collectively constituting the respective V's.

Each strut and accordingly each V-strut is equipped at its upper end with a fixed pivot-axis and at its lower end with a movable pivot-axis, the struts constituting each pair or V-strut having their fixed pivot-axes alined. The fixed pivot-axes are arranged to permit transverse pivotal movement of the several struts. This pivotal movement of the struts transversely of the craft is particularly advantageous in that bodily lateral and vertical movement of the axle 18 and wheels 12 may take place in response to laterally directed shocks in launching and landing.

Figure 2:
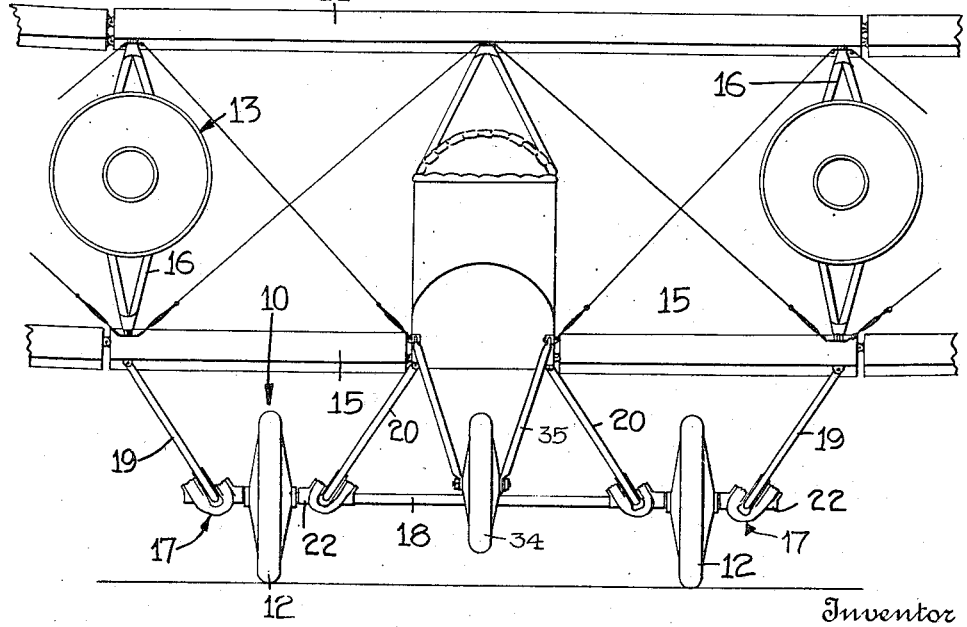
Fig. 2 is a front elevation of the aeroplane illustrated in Fig. 1.

It will be observed upon reference to Fig. 2 that the wheels 12 are located intermediate the struts constituting the respective V's when viewed from either the front or the rear. It will be also noted that the pairs of struts which constitute the said V's engage respectively beneath the fuselage and the motor units—*i. e.*, the weight masses, and that the resulting impact is transmitted directly and equally to four points on the axle. The bending moment heretofore concentrated at the center of the axle is in this way avoided and distributed equally in the plane of each wheel. A much stronger and generally more efficient landing gear is the result.

The shock absorbers 17 may each be described as comprising a multiple number of elastics 21, a sleeve 22, and a guide 23. Said guide 23 is of an inverted U form and exteriorly channeled or curved. The extensions of the guides intersect or embrace the V-struts adjacent the bights of the V to afford abutments 24 for the elastics 21. These elastics are laced transversely of the axle beneath the bight in each V-strut for contact with the abutments 24 and over and across the sleeve 22 for contact with flanges 25 formed integrally with the sleeve and extended outwardly therefrom obliquely to the axis thereof and parallel with the V-strut with which the elastics engage. The flanges 25 (of which there are two) formed on each sleeve provide with an enlargement 26, formed intermediate the flanges and integrally with the sleeve, channels 27 for the reception of the elastics 21. Movement of the elastics longitudinally of the axle is accordingly avoided. Each sleeve is fastened to the axle by a penetrating bolt or pin 28.

A yoke 28' is arranged to extend parallel with each V-strut to maintain the said strut at the desired oblique angle to the axle 18. At one end the yoke is spread or shaped to straddle the sleeve 22. The terminals of the legs 29 thus formed are inturned as indicated at 30 for fitting engagement in alined openings formed in the sleeve 22 and the axle 18. The opposite end of the yoke 28' is mounted to engage in an opening 31 formed in the guide 23. For an understanding of the arrangement disclosed, see Fig. 5 of the drawings.

The landing gear wheels and axle, in response to a vertically directed shock, assume the position indicated by dotted lines in Fig. 3. In response to a laterally and vertically directed shock, the said struts assume the position indicated by dotted lines in Fig. 4. In either instance, the total shock is borne by at least three of the shock absorbers 17 and concentration of the total impact upon any given point in the axle avoided. The landing gear, viewed from any angle, presents struts V-arranged, the struts in pairs constituting the V-arrangement when viewed from front or rear and the struts, singly, constituting the V-arrangement when viewed from either side. All struts extend angularly laterally or obliquely to the axis of the axle and each is arranged to pivot upon the shock absorber elastics which engage therewith. This pivotal movement I have described as the movable pivot-axis.

To cushion the V-struts at their points of intersection with the axle, the sleeve 22 is enlarged as at 32 in the plane of its associated strut and provided with a cushioning strip 33 of rubber for disposition intermediate the bight in the V-strut and the sleeve. This enlargement in each instance is formed diametrically opposite the enlargement 26 of the sleeve.

As an auxiliary element of the landing gear, a third wheel 34 may be provided in advance of the axle 18 and in the vertical plane of the longitudinal axis of the machine. V-struts 35 arranged for longitudinal pivotal movement beneath the nose end of the fuselage support this wheel. Wires 36 tie the struts 35 to the fuselage 11 forwardly and wires 37 to the fuselage 11 aft. This auxiliary or third wheel may or may not be used.

While in the foregoing there has been illustrated in the drawings and described in the specification such combination and arrangement of elements as constitute the preferred construction or embodiment of this invention, it is nevertheless desired to emphasize the fact that interpretation of the invention should only be conclusive when made in the light of the subjoined claims.

What is claimed is:

1. A landing gear for aircraft including in combination with the fuselage and weight masses carried by the wing structure of the machine, of laterally separated downwardly converging pairs of struts fastened respectively to the fuselage and beneath the weight masses, landing devices mounted respectively adjacent the foot of the pairs of struts intermediate the strut extremities, and independently acting shock absorbing connections respectively between the several struts and landing devices.

2. A landing gear for aircraft including laterally separated pairs of struts having their upper extremities pivoted for sidewise movement, landing devices mounted respectively at the foot of the pairs of struts adjacent the strut extremities, and separate shock absorbing connections respectively between the struts and landing devices, each connection affording an independent pivotal anchorage for its associated engaging strut.

3. A landing gear for aircraft including a plurality of struts pivoted for movement in a transverse plane in response to laterally directed shocks, an axle, and shock absorber elastics arranged beneath the foot of each strut and over the axle to yieldingly support the weight mass or masses of the craft.

4. A landing gear for aircraft including a plurality of pivoted struts V-arranged from all angles, an axle mounted to commonly intersect each strut transversely adjacent its bight portion and shock absorber elastics arranged beneath the bight portions of the several struts and over said axle to yieldingly support the weight mass or masses of the craft.

5. A landing gear for aircraft including a plurality of shock absorbers and struts arranged to effectually pivot upon said shock absorbers in response to laterally directed shocks.

6. A landing gear for aircraft including a plurality of struts V-arranged from all angles and having fixed pivot-axes and movable pivot-axes respectively at opposite ends.

7. An aircraft having its weight masses laterally distributed, in combination with a landing gear comprising an axle and landing gear struts arranged oblique to the axis thereof for securement respectively directly beneath the several weight masses, said axle, together with wheels mounted thereon, being laterally movable and vertically movable in response to shocks directed thereon in corresponding planes.

8. An aircraft having its weight masses laterally distributed, in combination with a landing gear comprising an axle, and separate V-struts arranged in pairs oblique to the axis thereof for securement respectively directly beneath the several weight masses.

9. An aircraft having its weight masses laterally distributed, in combination with a landing gear comprising an axle, and V-struts V-arranged, the legs of each V engaging respectively the distributed weight masses.

10. An aircraft having its weight masses laterally distributed, in combination with a landing gear comprising an axle, wheels, and pairs of struts V-arranged to engage respectively with said axle adjacent said wheels and with the craft in the vertical planes of the respective weight masses.

11. An aircraft having its weight masses laterally separated, in combination with a landing gear comprising landing gear devices arranged respectively in vertical planes intermediate the vertical planes of said weight masses, and landing gear struts founding said devices, said struts being arranged in pairs with the struts of each pair arranged to converge downwardly so that said devices may be supported at points adjacent their respective opposite faces and the weight of the masses equally distributed thereon.

In testimony whereof I affix my signature.

HENRY KLECKLER.